US009208254B2

(12) United States Patent
Zhang et al.

(10) Patent No.: US 9,208,254 B2
(45) Date of Patent: Dec. 8, 2015

(54) QUERY AND INDEX OVER DOCUMENTS

(71) Applicant: Microsoft Corporation, Redmond, WA (US)

(72) Inventors: Li Zhang, Sunnyvale, CA (US); Mihai Budiu, Sunnyvale, CA (US); Yuan Yu, Cupertino, CA (US); Gordon D. Plotkin, Edinburgh (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 164 days.

(21) Appl. No.: 13/709,064

(22) Filed: Dec. 10, 2012

(65) Prior Publication Data

US 2014/0164388 A1 Jun. 12, 2014

(51) Int. Cl.
  *G06F 17/30* (2006.01)
  *G06F 17/22* (2006.01)
(52) U.S. Cl.
  CPC .... *G06F 17/30911* (2013.01); *G06F 17/30011* (2013.01); *G06F 17/30625* (2013.01); *G06F 17/2247* (2013.01); *Y10S 707/956* (2013.01)
(58) Field of Classification Search
  CPC .......... G06F 17/30011; G06F 17/2247; G06F 17/30911; G06F 17/30625; Y10S 707/956
  USPC ............................ 707/742, 797, 798, E17.008
  See application file for complete search history.

(56) References Cited

U.S. PATENT DOCUMENTS

| | | | | |
|---|---|---|---|---|
| 5,301,314 | A * | 4/1994 | Gifford et al. .......................... | 1/1 |
| 5,404,518 | A * | 4/1995 | Gilbertson et al. .................... | 1/1 |
| 5,649,023 | A * | 7/1997 | Barbara et al. ................ | 382/159 |
| 5,696,963 | A * | 12/1997 | Ahn ..................................... | 1/1 |
| 6,366,934 | B1 * | 4/2002 | Cheng et al. .................. | 715/210 |
| 6,377,946 | B1 * | 4/2002 | Okamoto et al. ..................... | 1/1 |
| 6,510,406 | B1 * | 1/2003 | Marchisio ......................... | 704/9 |
| 6,510,425 | B1 * | 1/2003 | Okamoto et al. ..................... | 1/1 |
| 6,584,459 | B1 * | 6/2003 | Chang et al. .................. | 707/812 |
| 6,684,204 | B1 * | 1/2004 | Lal ...................................... | 1/1 |

(Continued)

FOREIGN PATENT DOCUMENTS

WO   WO 03/105028   * 12/2003   .............. G06F 17/30

OTHER PUBLICATIONS

Yan et al., "Graph Indexing: A Frequency Structure-based Approach", In Proceedings of the 2004 ACM SIGMOD International Conference on Management of Data, 2004, 12 pages.*

Vagena et al., "Twig Query Processing over Graph-Structured XML Data", In Proceedings of the 7th International Workshop on the Web and Databases (WebDB' 04), 2004, pp. 43-48.*

Shasha et al., "Algorithmics and Applications of Tree and Graph Searching", In Proceedings of the Twenty-First ACM SIGMOD-SIGACT-SIGART Symposium on Principles of Database Systems (PODS' 02), 2002, pp. 39-52.*

(Continued)

*Primary Examiner* — Phuong Thao Cao

(74) *Attorney, Agent, or Firm* — Sandy Swain; Steve Wight; Micky Minhas

(57) ABSTRACT

A document index is generated from a set of documents and is used to identify documents that match one or more queries. A tree is generated for each document with a node corresponding to each object of the document. The nodes of the generated trees are merged or combined to generate the document index, which is itself a tree. In addition, an inverted index is generated for each node of the index that identifies the tree(s) that the node originated from. When a query is received, the query is first executed against the document index tree: during the execution, proper set operations are applied to the inverted indices associated with the nodes matched by the query. The resulted set identifies the documents that may match the query. The query is then executed on the identified documents.

15 Claims, 8 Drawing Sheets

(56) References Cited

U.S. PATENT DOCUMENTS

| | | | |
|---|---|---|---|
| 6,701,305 B1* | 3/2004 | Holt et al. | 706/45 |
| 6,847,966 B1* | 1/2005 | Sommer et al. | 707/739 |
| 6,853,992 B2* | 2/2005 | Igata | 707/741 |
| 7,152,065 B2* | 12/2006 | Behrens et al. | 1/1 |
| 7,370,061 B2* | 5/2008 | Chakraborty et al. | 1/1 |
| 7,613,602 B2* | 11/2009 | Kanawa | 704/9 |
| 7,657,515 B1* | 2/2010 | Jewell | 707/999.003 |
| 7,657,540 B1* | 2/2010 | Bayliss | 707/609 |
| 7,730,104 B2* | 6/2010 | Uchiyama et al. | 707/802 |
| 7,844,633 B2* | 11/2010 | Miszczyk et al. | 707/797 |
| 7,908,430 B2* | 3/2011 | Lapir et al. | 711/108 |
| 7,953,752 B2* | 5/2011 | Soules et al. | 707/771 |
| 8,005,817 B1* | 8/2011 | Amer-Yahia et al. | 707/713 |
| 8,010,544 B2* | 8/2011 | Tiyyagura | 707/758 |
| 8,024,329 B1 | 9/2011 | Rennison | |
| 8,032,532 B2* | 10/2011 | Broder et al. | 707/742 |
| 8,219,563 B2* | 7/2012 | Baby et al. | 707/742 |
| 8,229,921 B2* | 7/2012 | Ramakrishnan et al. | 707/715 |
| 8,260,784 B2* | 9/2012 | Beyer et al. | 707/742 |
| 8,442,998 B2* | 5/2013 | Mansfield et al. | 707/791 |
| 8,645,388 B1* | 2/2014 | Bueche et al. | 707/742 |
| 8,838,650 B2* | 9/2014 | Fei et al. | 707/797 |
| 2001/0007987 A1* | 7/2001 | Igata | 707/3 |
| 2002/0103809 A1* | 8/2002 | Starzl et al. | 707/102 |
| 2002/0156763 A1* | 10/2002 | Marchisio | 707/1 |
| 2003/0074352 A1* | 4/2003 | Raboczi et al. | 707/4 |
| 2003/0212666 A1* | 11/2003 | Basu et al. | 707/3 |
| 2003/0229626 A1* | 12/2003 | Nayak | 707/3 |
| 2004/0044659 A1* | 3/2004 | Judd et al. | 707/3 |
| 2004/0078363 A1* | 4/2004 | Kawatani | 707/3 |
| 2004/0098372 A1* | 5/2004 | Bayliss et al. | 707/3 |
| 2004/0111437 A1* | 6/2004 | Ogawa | 707/104.1 |
| 2005/0038785 A1* | 2/2005 | Agrawal et al. | 707/6 |
| 2005/0066271 A1* | 3/2005 | Uchiyama et al. | 715/513 |
| 2005/0114314 A1* | 5/2005 | Fan et al. | 707/3 |
| 2005/0187954 A1* | 8/2005 | Raman et al. | 707/100 |
| 2005/0262053 A1* | 11/2005 | Liou et al. | 707/3 |
| 2005/0289138 A1* | 12/2005 | Cheng et al. | 707/5 |
| 2006/0036588 A1* | 2/2006 | Frank et al. | 707/3 |
| 2006/0053122 A1* | 3/2006 | Korn et al. | 707/100 |
| 2006/0106767 A1* | 5/2006 | Adcock et al. | 707/3 |
| 2006/0106783 A1* | 5/2006 | Saffer et al. | 707/3 |
| 2006/0110073 A1* | 5/2006 | Matsushita et al. | 382/305 |
| 2006/0167928 A1* | 7/2006 | Chakraborty et al. | 707/102 |
| 2006/0179051 A1* | 8/2006 | Whitney et al. | 707/5 |
| 2007/0094250 A1* | 4/2007 | Kapur | 707/5 |
| 2007/0124299 A1* | 5/2007 | Martin et al. | 707/5 |
| 2007/0271243 A1* | 11/2007 | Fan et al. | 707/3 |
| 2008/0010296 A1* | 1/2008 | Bayliss et al. | 707/10 |
| 2008/0133473 A1* | 6/2008 | Broder et al. | 707/3 |
| 2008/0222187 A1* | 9/2008 | Beyer et al. | 707/102 |
| 2008/0282145 A1* | 11/2008 | Heifets et al. | 715/237 |
| 2009/0006314 A1* | 1/2009 | Balmin et al. | 707/2 |
| 2009/0006447 A1* | 1/2009 | Balmin et al. | 707/102 |
| 2009/0210389 A1* | 8/2009 | Firestein et al. | 707/3 |
| 2009/0307256 A1* | 12/2009 | Tiyyagura | 707/102 |
| 2010/0036838 A1* | 2/2010 | Ellis | 707/5 |
| 2010/0094910 A1* | 4/2010 | Bayliss | 707/800 |
| 2010/0100543 A1* | 4/2010 | Brady | 707/732 |
| 2010/0115003 A1* | 5/2010 | Soules et al. | 707/822 |
| 2010/0169311 A1* | 7/2010 | Tengli et al. | 707/736 |
| 2010/0211572 A1* | 8/2010 | Beyer et al. | 707/742 |
| 2010/0306273 A1 | 12/2010 | Branigan et al. | |
| 2011/0099059 A1* | 4/2011 | Agarwal et al. | 705/14.43 |
| 2011/0099205 A1* | 4/2011 | Shmueli et al. | 707/797 |
| 2011/0106811 A1* | 5/2011 | Novoselsky et al. | 707/741 |
| 2011/0119254 A1* | 5/2011 | Brown et al. | 707/722 |
| 2011/0225159 A1* | 9/2011 | Murray | 707/739 |
| 2011/0246298 A1 | 10/2011 | Williams et al. | |
| 2011/0296299 A1* | 12/2011 | Parker | 715/255 |
| 2011/0302198 A1* | 12/2011 | Baby et al. | 707/769 |
| 2012/0011150 A1* | 1/2012 | Swaminathan et al. | 707/770 |
| 2012/0089611 A1* | 4/2012 | Brochard | 707/742 |
| 2012/0166440 A1* | 6/2012 | Shmueli et al. | 707/737 |
| 2012/0179712 A1* | 7/2012 | Bestgen et al. | 707/769 |
| 2012/0185511 A1* | 7/2012 | Mansfield et al. | 707/792 |
| 2012/0246146 A1* | 9/2012 | Lee | 707/714 |
| 2012/0254189 A1* | 10/2012 | Shah | 707/741 |
| 2012/0259862 A1* | 10/2012 | Kim et al. | 707/742 |
| 2013/0066880 A1* | 3/2013 | Schramm et al. | 707/743 |
| 2013/0086127 A1* | 4/2013 | Pogmore | 707/803 |
| 2014/0067819 A1* | 3/2014 | Novoselsky et al. | 707/741 |
| 2014/0095519 A1* | 4/2014 | Liu et al. | 707/755 |
| 2014/0143280 A1* | 5/2014 | Duan et al. | 707/798 |
| 2014/0164388 A1* | 6/2014 | Zhang et al. | 707/742 |

OTHER PUBLICATIONS

Kaushik et al., "On the Integration of Structure Indexes and Inverted Lists", In Proceedings of the 2004 ACM SIGMOD International Conference on Management of Data (SIGMOD 2004), 2004, 12 pages.*

Wang et al., "ViST: A Dynamic Index Method for Querying XML data by Tree Structures", In Proceedings of the 2003 ACM SIGMOD International Conference on Management of Data, 2003, pp. 110-121.*

Catania et al., "XML Document Indexes: A Classification", IEEE Internet Computing published by the IEEE Computer Society, Sep.-Oct. 2005, pp. 64-71.*

Chien et al., "Efficient Structural Joins on Indexed XML documents", In Proceedings of the 28th VLDB Conference, Hong Kong, China, 2002, 13 pages.*

Li et al., "Indexing and Querying XML Data for Regular Path Expressions", In Proceedings of the 27th VLDB Conference, Roma, Italy, 2001, pp. 361-370.*

Budiu et al. "Unified Query Processing for JSON Documents and Indexes", 16 pages, accessed online at <http://research.microsoft.com/pubs/230054/jpath.pdf> on May 17, 2015.*

Barton et al., "Designing and Evaluating an Index for Graph Structured Data", Sixth IEEE International Conference on Data Mining—Workshops (ICDMW'06), 5 pages, 2006.*

Zhou et al., "Adjacency Matrix Based Full-Text Indexing Models", Journal of Software, vol. 13, No. 10, pp. 1933-1942, 2002.*

"Elasticsearch—Open Source, Distributed, Restful, Search Engine", Retrieved at <<http://www.elasticsearch.org/>>, Retrieved Date: Sep. 17, 2012, pp. 4.

Bhat, et al., "Moving Towards Non-Relational Databases", Retrieved at <<http://www.ijcaonline.org/journal/number13/pxc387446.pdf>>, International Journal of Computer Applications, vol. 1, Issue No. 13, Feb. 2010, pp. 7.

"Basho : Riak Search", Retrieved at <<http://wiki.basho.com/Riak-Search.html>>, Retrieved Date: Sep. 17, 2012, pp. 3.

Bonnet, et al., "Reduce, You Say: What NoSQL can do for Data Aggregation and BI in Large Repositories", Retrieved at <<http://ieeexplore.ieee.org/stamp/stamp.jsp?tp=&arnumber=6059864>>, In 22nd International Workshop on Database and Expert Systems Applications, Aug. 29, 2011, pp. 6.

Padhy, et al., "RDBMS to NoSQL: Reviewing Some Next-Generation Non-Relational Database's", Retrieved at <<http://www.ijaest.iserp.org/archieves/19-Sep-15-30-11/Vol-No.11-Issue-No.1/3. IJAEST-Vol-No-11-Issue-No-1-RDBMS-to-NoSQL-Reviewing-Some-Next-Generation-Non-Relational-Database's-015-030.pdf>>, International Journal of Advanced Engineering Sciences and Technologies, vol. No. 11, Issue No. 1, Jan. 19, 2011, pp. 16.

"International Search Report & Written Opinion for PCT Application No. PCT/US2013/073927", Mailed Date: Jul. 7, 2014, Filed Date: Dec. 9, 2013, 11 Pages.

Gou, et al.,"Efficiently Querying Large XML Data Repositories: A Survey", In IEEE Transactions on Knowledge and Data Engineering, vol. 19, Issue 10, Oct. 2007, pp. 1381-1403.

Weigel, Felix, "Content-Aware DataGuides for Indexing Semi-Structured Data", Published on: Apr. 5, 2003, 137 Pages. Available At: http://www.en.pms.ifi.lmu.de/publications/diplomarbeiten/Felix.Weigel/weigel03cadg.pdf.

* cited by examiner

QUERY AND INDEX OVER DOCUMENTS

BACKGROUND

JavaScript Object Notation (JSON) is a data-interchange format that is becoming the format of choice for many commercial products and research products. One of the most typical operations performed on sets of JSON documents, and other document formats such as XML and HTML, is the processing of structural queries, which matches data based on structural patterns, besides specific field values. The expressiveness of structural queries makes it difficult to apply the indexing procedure designed for relational data and queries. The lack of a schema associated with JSON documents further impedes the applicability of traditional techniques for speeding-up query processing (e.g., using secondary indexes).

SUMMARY

A document index is generated from a set of JSON documents and is used to identify documents that may match any given query. A tree is generated for each document with a node corresponding to each object of the document. The nodes of the generated trees are merged or combined to generate the document index, which is itself a tree. In addition, an inverted index is generated for each node of the index that identifies the document tree or trees that the node originated from. When a query is received, the query is first executed against the document index tree: during the execution, proper set operations are applied to the inverted indices associated with the nodes matched by the query. The resulted set identifies the documents that may match the query. The query is then re-executed on the identified documents. Running a query on an index will not miss any matching documents, but may return some documents that do not match the query.

In an implementation, a plurality of documents is received by a computing device. Each document includes a plurality of objects. For each document, a graph is generated representing the document. Each graph comprises a node corresponding to each object of the represented document. A document index is generated by merging the nodes of the generated graphs. Each node in the document index includes an identifier of one or more graphs that include the node. A query is received by the computing device. One or more documents of the plurality of documents that are responsive to the query are identified using the generated document index. The query is re-executed on the identified one or more documents to determine a subset of the one or more documents that match the query. The result of the query execution for this subset of is provided in response to the query, as either whole documents or document fragments.

In an implementation, a document index is received by a computing device. The document index includes a plurality of nodes, and each node includes identifiers of one or more graphs of a plurality of graphs, and each graph represents a document of a plurality of documents. A query is received by the computing device. The query includes a plurality of sub-queries. For each sub-query: nodes in the document index that match the sub-query are determined; and for each determined node that matches the sub-query, the one or more graphs identified by the identifiers of the determined node are determined. A union of the determined one or more graphs is determined for each sub-query. Documents that are represented by the graphs of the determined union of the graphs are identified. The query is re-executed on the identified one or more documents to determine a subset of the one or more documents that match the query. The result of the query execution for this subset of is provided in response to the query, as either whole documents or document fragments.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
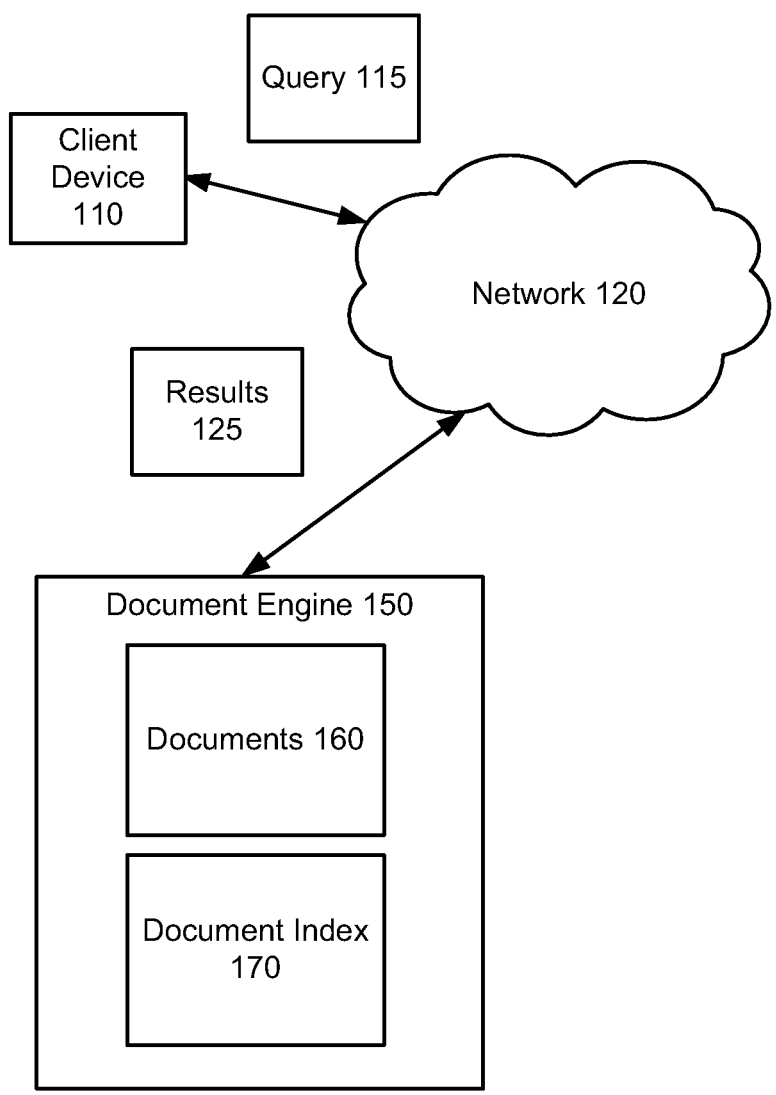
FIG. 1 is an illustration of an example environment for fulfilling queries.

FIG. 1 is an illustration of an example environment 100 for fulfilling queries. The environment 100 may include a client device 110, and a document engine 150 in communication with the client device 110 through a network 120. The network 120 may be a variety of network types including the public switched telephone network (PSTN), a cellular telephone network, and a packet switched network (e.g., the Internet).

In some implementations, the client device 110 may include a desktop personal computer, workstation, laptop, smart phone, cell phone, or any WAP-enabled device or any other computing device capable of interfacing directly or indirectly with the network 120. A client device 110 may be implemented using a general purpose computing device such as the computing device 800 illustrated in FIG. 8, for example. While only one client device 110 is shown, it is for illustrative purposes only; there is no limit to the number of client devices that may be supported.

The document engine 150 may receive one or more queries 115 from the client device 110. The document engine 150 may generate a set of results 125 that is responsive to the query 115 based on the documents 160. The results 125 may include links, document fragments, or other indicators, of the documents 160 that are responsive to the query 115. The documents 160 may include a variety of document types including HTML documents, XML documents, and JavaScript Object Notation (JSON) documents. Other types of documents may be supported. The documents 160 may not be associated with a schema.

In some implementations, each of the documents 160 may have a label and one or more objects. Each object may itself have a label and one or more objects or values. In addition, each document and object may include one or more arrays. Each array may have a label and may be an array of values or an array of objects. Other document grammars and/or types may be used or supported.

For purposes of simplification, the documents 160 described herein are described where the values are of the type string. However, other types may be supported by the implementations described herein.

For example, two documents 160, document A and document B, for storing data related to two companies using the above grammar are:

---
Document A
---
```
{
    "location":
    [
        {"country": "Germany", "city": "Berlin"},
        {"country": "France", "city": "Paris"}
    ],
    "headquarters": "Belgium",
    "exports":
    [
        {"city": "Moscow"},
        {"city": "Athens"}
    ]
}
```
---

---
Document B
---
```
{
    "location":
    [
        {"country": "Germany", "city": "Berlin"},
    ],
    "headquarters": "Italy",
    "exports":
    [
        {"city": "Berlin", "dealers":[{ "name": "Hans"}] },
        {"city": "Amsterdam"}
    ]
}
```
---

Figure 2:
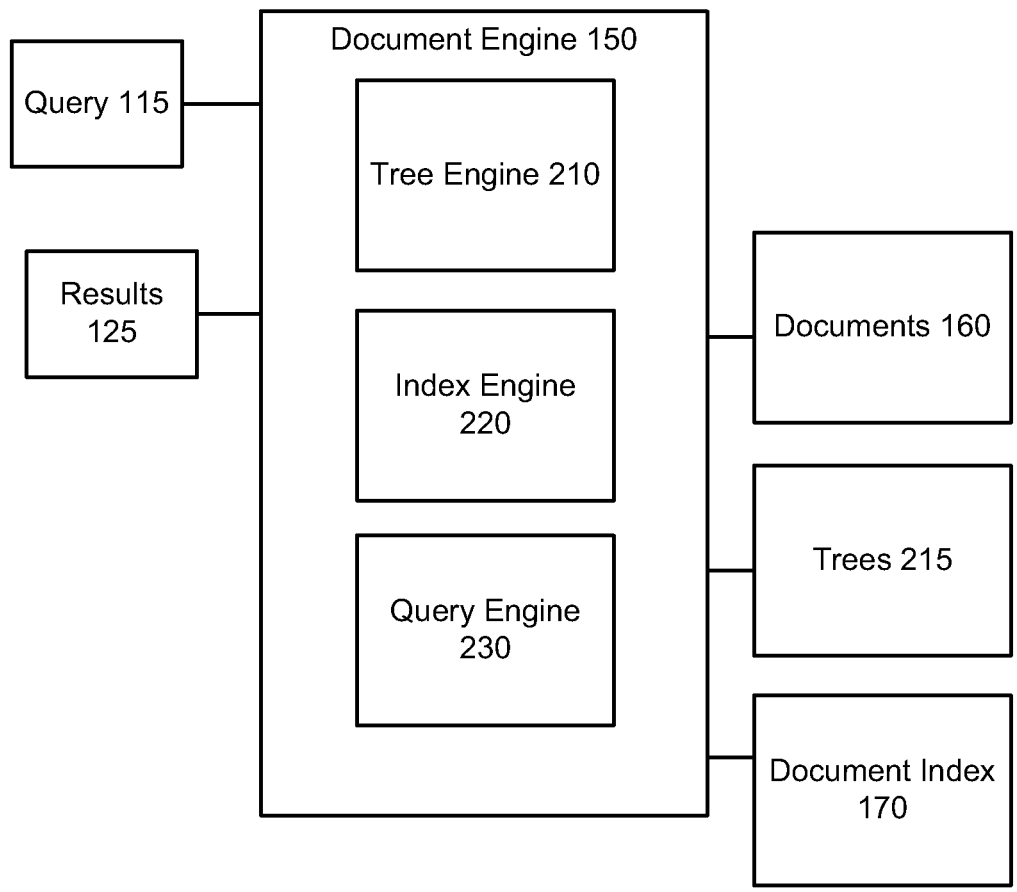
FIG. 2 is an illustration of an example document engine.

As described further with respect to FIG. 2, the document engine 150 may generate a document index 170 from the documents 160, and may use the document index 170 to generate the results 125 in response to a query 115. In some implementations, the document engine 150 may generate graphs, or trees or other data structures, from the documents 160, and may generate the document index 170 by merging the generated graphs. The document index 170 may be used by the document engine 150 to identify documents 160 that are responsive to a query 115 providing an improved search experience to users.

FIG. 2 is an illustration of an example document engine 150. The document engine 150 may include, but is not limited to, a tree engine 210, an index engine 220, and a query engine 230. More or fewer components may be supported. Some or all of the components of the document engine 150 may be implemented using one or more general purpose computing devices such as the computing device 800, for example.

The tree engine 210 may generate one or more trees 215 from the documents 160. A tree may be generated for each document in the documents 160. In some implementations, each of the trees 215 may include a plurality of nodes. Each internal node of a tree may represent an object in the document and may have a label that corresponds to the label of the object. Each leaf node of a tree may represent a value and may have a label that corresponds to the value. A label representing the string value of a leaf node is always distinguished from a regular object label, even when they have the same spelling. Arrays in the documents 160 may be rewritten as objects with numeric labels and may be represented in a tree as internal nodes like objects. Each of the trees 215 may have a root node that has a null or empty string value. Note that other data structures may be used for the trees 215; for example, in some implementations, each tree may be implemented as a directed graph.

Figure 3:
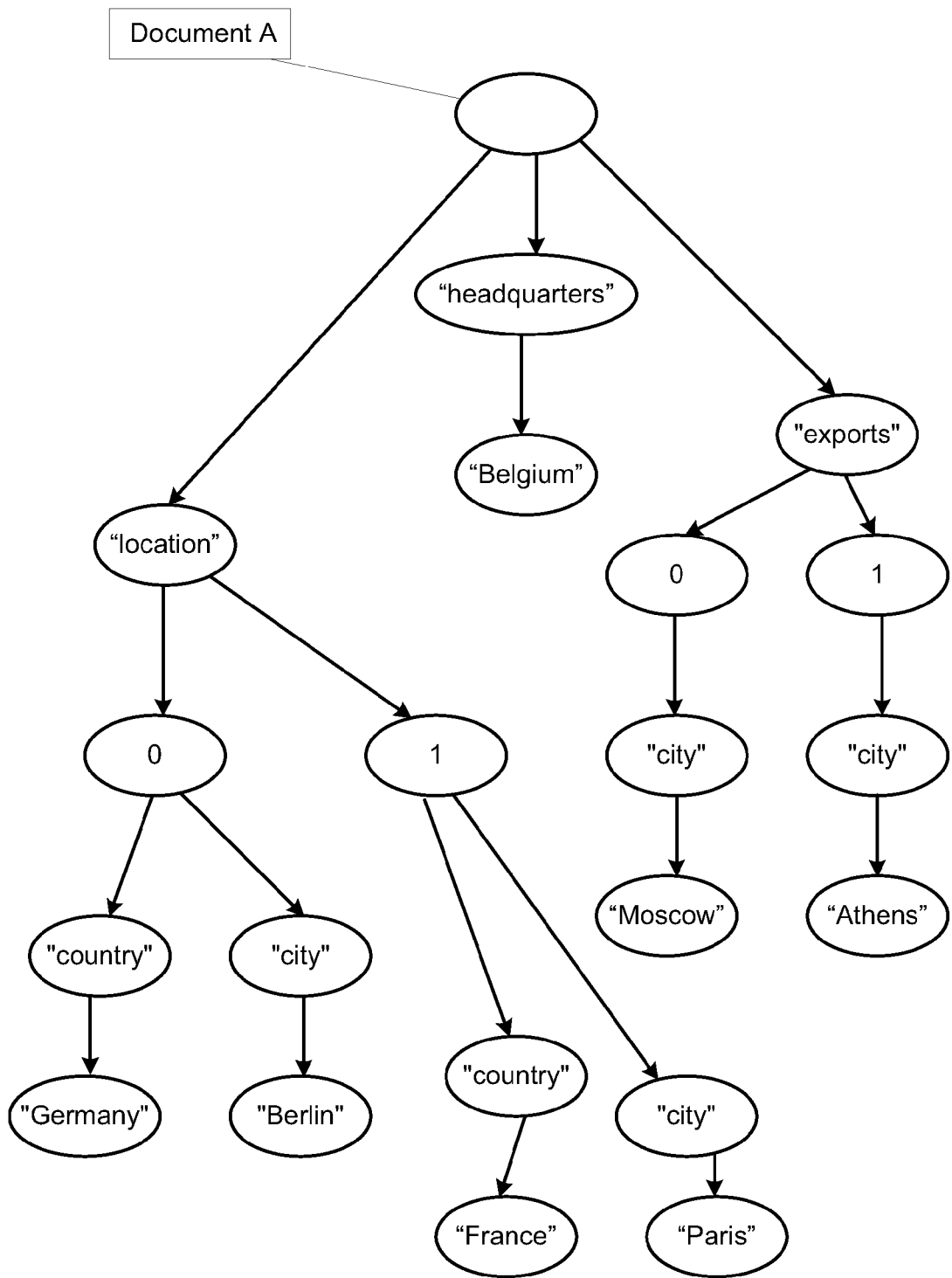
FIG. 3 is an illustration of an example tree.
Figure 4:
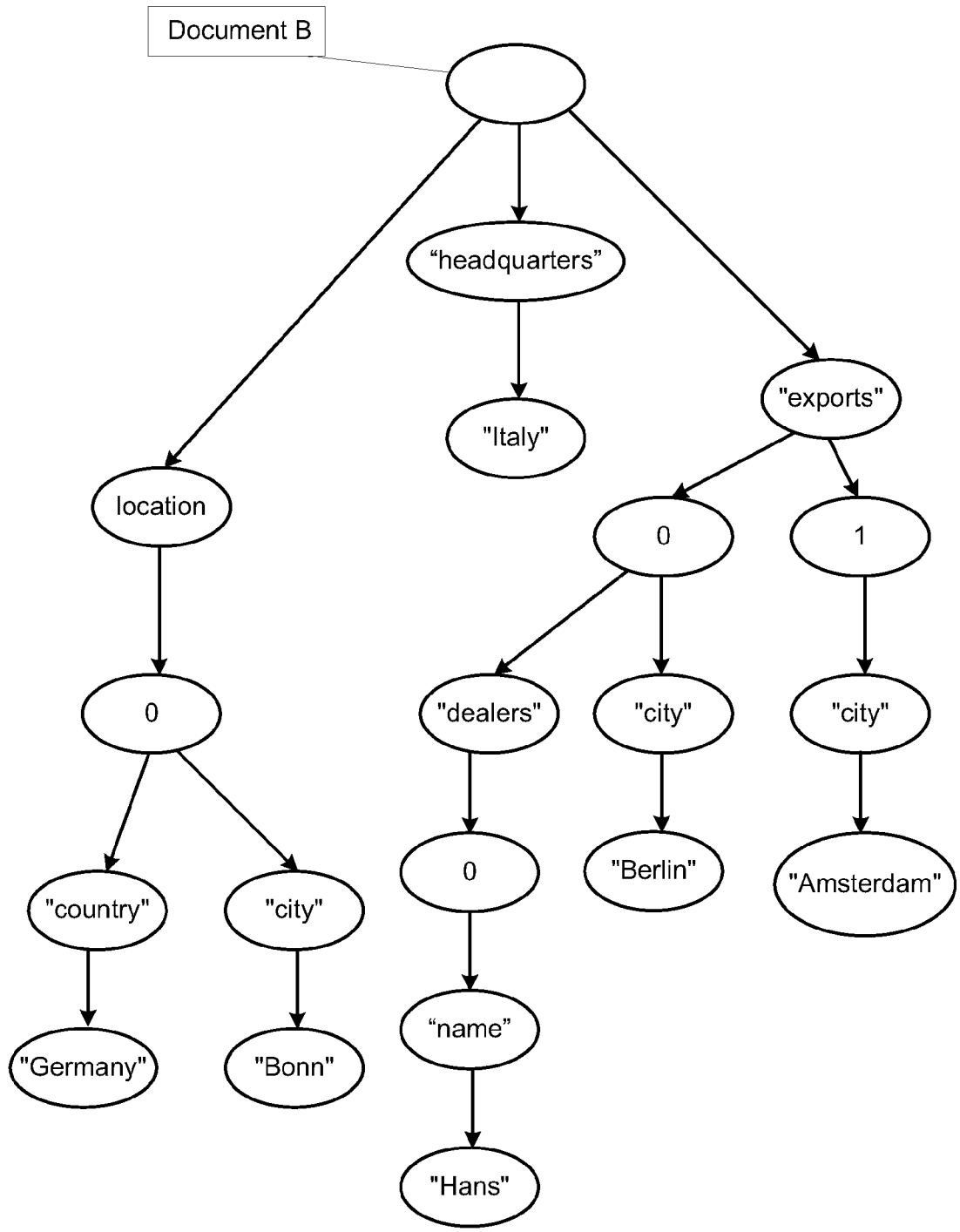
FIG. 4 is an illustration of another example tree.

For example, FIG. 3 illustrates an example tree 310 generated from the document A, and FIG. 4 illustrates an example tree 410 generated from the document B. As can be seen in FIGS. 3 and 4, each of the trees 310 and 410 includes nodes representing each object and value from the documents A and B, respectively. As noted above, the arrays corresponding to the location and export labels have been rewritten in each tree as objects with numeric labels.

In some implementations, the tree engine 210 may generate a tree 215 from a document 160 recursively. For example, the tree engine 210 may construct the tree 215 using the following function buildTree where "rootLabel" is the label to be attached to the root of the generated tree, and "Document" is the document that the tree is generated from. Other methods for generating trees 215 from documents 160 may be used.

---
```
function buildTree(Document, rootLabel)
    If Document is value then
        parent = new Node( )
        label(parent)=rootLabel
        child = new Node( )
        label(child) =Document
        parent.children.Append(child)
        return parent
    else if Document is object then
        parent = new Node(rootLabel)
        for all pair in Document.pairs do
            child = buildTree(pair.value, pair.label)
            parent.children.Append(child)
        end for
        return parent
    end if
end function
```
---

The query engine 230 may match queries 115 that include one or more sub-queries. Each sub-query is itself a query and may include one or more operators and what are referred to as "node matchers". In an implementation, the query engine 230 may accept for matching queries 115 having the following syntax:

---
| | |
|---|---|
| query:= nm | matches nodes specified by the node matcher function |
| ε | empty query |
| ? | any operator |
| / | child operator |
| query query | query sequence operator |
| query \| query | logical or operator |
| query & query | logical and operator |
| query* | star operator |
| ˜query | snap operator |
---

A node matcher, or nm, is an arbitrary Boolean function that returns true when a label of a node matches one or more values specified by the node matcher. Nodematchers may be further classified as labelmatchers, which match labels of internal nodes, and valuematchers, which match only basevalues. Either of these can invoke arbitrary Boolean functions.

The queries 115 may be generated using the above syntax by combining sub-queries using operators from the above described syntax. Each sub-query may be a node matcher. The query engine 230 may recursively solve a received query by solving each sub-query of the query and then combining the results based on the particular operators (e.g., &).

The query engine 230 may apply a query 115 to the root node of a tree 215 and return a set of nodes of the tree 215 whose values match the query 115. A query q matches the tree t if it returns a non-empty set of nodes. In general, a query q is applied at a node v. The meanings of the various operators are defined recursively below:

| Query(q,v) | Case q of: | Result |
|---|---|---|
| | $\epsilon$ | $\{v\}$ |
| | nm | $\{v\}$ if nm(v.label) |
| | | $\{\}$ otherwise |
| | / | v.children |
| | ? | $\{v\}$ |
| | Q1 & Q2 | Query(Q1, v) $\cap$ Query(Q2,v) |
| | Q1 \| Q2 | Query(Q1,v) $\cup$ Query(Q2,v) |
| | Q1 Q2 | $\cup_{u \in Query(Q1,v)}$ Query(Q2, u) |
| | Q1* | $\cup_{i \geq 0}$ Query($Q_1^i$, v) |
| | ˆQ1 | $\{v\}$ if Query(Q1, v) $\neq \{\}$ |
| | | $\{\}$ otherwise |

The node matcher nm may be applied to a label of a node by the query engine 230. The query engine 230 may return the node itself if the node matcher applied to the label returns "true", or the empty set otherwise. Some example node matcher functions may include a function that matches a particular label of a node, a function that matches a label that is greater than a specified length, and a function that matches a label that includes a particular substring. Other types of node matchers may be used.

The epsilon operator "$\epsilon$" may denote an empty query (which may be written using an empty string). The epsilon operator may match any node that it is applied to by the query engine 230.

The any operator "?" is a special node matcher which matches all labels. Similarly to the epsilon operator, the any operator may match any node that it is applied to by the query engine 230. Separate versions of the "?" operator may be used for labelmatchers and valuematchers (e.g., by denoting the valuematcher with @?).

The child operator "/" matches all children of a node. The child operator matches any internal nodes, and produces an empty set when applied to a leaf node by the query engine 230.

The sequence operator combines two arbitrary queries $q_1$ and $q_2$ and is denoted by the juxtaposition of two queries in a query 115. The query engine 230 may apply the sequence operator to the queries $q_1$ and $q_2$ by applying $q_1$ to a node v, and then applying $q_2$ to the results of applying $q_1$ to the node v. The union of the results of applying $q_2$ is the result of the combined query.

The or operator "|" and the and operator "&" both combine two queries $q_1$ and $q_2$. For the or operator, the query engine 230 may return the union of the results of the queries $q_1$ and $q_2$. For the and operator, the query engine 230 may return the intersection of the results of the queries $q_1$ and $q_2$.

The star operator * is based on the Kleene star operator from regular expressions. The result of the applying the star operator to a query q by the query engine 230 may be the union of the results applying the query q to a node 0 times, 1 times, 2 times in sequence, etc. For example, the query "/*/ "Berlin"" when applied by the query engine 230 may produce results that include all trees that include a child node that is labeled "Berlin". "Bounded" versions of the star operator may be also used, which match up to a number of times, or more than a specified number of times.

The snap operator ˆ is used to determine whether a query q matches anything. When the query engine 230 applies the snap operator to the results of the query q the query engine 230 returns the current node if the results are non-null, but rather than return the results, the results are discarded by the query engine 230, and only the current node is returned.

An additional "cut" operator may be used by the query engine 230 to return only fragments on the documents matched by a query. The syntax of the cut operator may be given by:

userquery=query ! query.

When matching a cut operator against a document, the algorithm may compute two sets of matching nodes as if the cut were a "sequence" operator separating two queries. However, the final result of the query $q_1$ ! $q_2$ may be composed from all sub-documents with roots matched by $q_1$ and each containing all nodes spanned by $q_2$ starting at the root of each of the sub-documents.

The index engine 220 may generate a document index 170 from the trees 215. The document index 170 may be an approximate summary of all of the trees 215. In some implementation, the document index 170 may be a tree generated by combining or merging some or all of the trees 215. Thus, the document index 170 may include both internal and leaf nodes. However, internal nodes can be only merged with other internal nodes, and leaf nodes can only be merged with other leaf nodes. Each node in the document index 170 may correspond to a set of nodes of the trees 215. When merging nodes, the resulting node may contain all the labels of the merged nodes. Thus some nodes in an index 170 may have multiple labels. A special label "*" may be used to denote "all possible labels", or may be used to approximate the set of labels in an index node when it becomes too large. The correspondence may be denoted by a map that associates each node in the document index 170 with corresponding trees 215. The map may be generated by the index engine 220.

The query engine 230 may search received queries 115 against the document index 170 to generate results 125 using the document index 170 and the map. For example, the query engine 230 may determine nodes from the index 170 that match a query 115. The query engine 230 may use the map to determine the trees 215 that have nodes that map to the determined nodes. Documents 160 that correspond to the determined nodes may be used to execute the query again resulting in a subset of the documents 160. The subset may be presented as the results 125.

The map may be what is referred to as an inverted index. Each node in the document index 170 may include an inverted index. The inverted index for a node may identify the tree(s) 215 that the node came from when the index 170 was generated.

Figure 5:
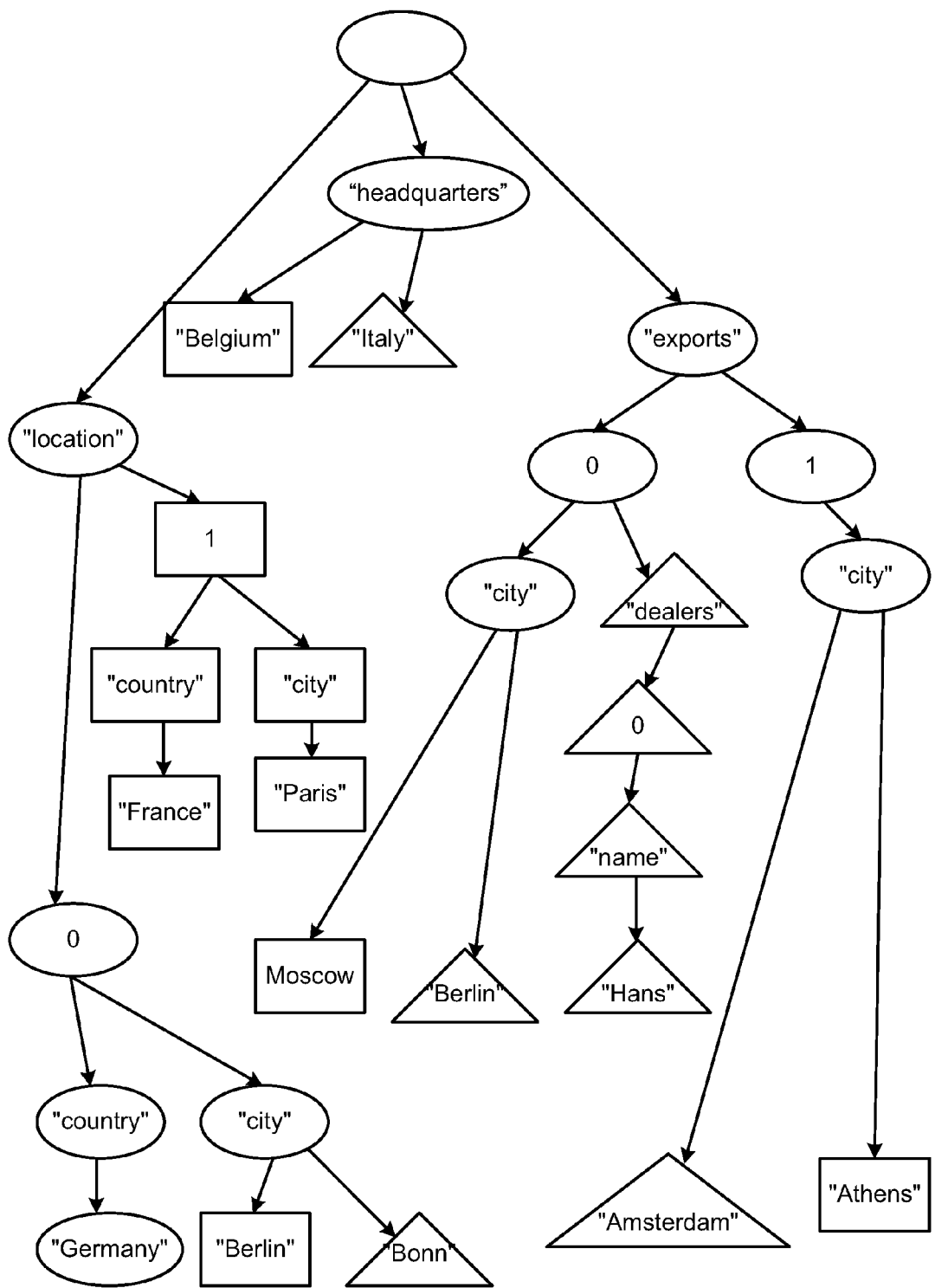
FIG. 5 is an illustration of an example document index.

For example, FIG. 5 is an illustration of an example document index 510 generated by merging the trees 310 and 410 shown in FIGS. 3 and 4. The nodes having a circular shape represent nodes that are part of both of the tree 310 and the tree 410. The nodes having a triangular shape represent nodes that are only part of the tree 410. The nodes having a rectangular shape represent nodes that are only part of the tree 310. Thus, any node with a circular shape has an inverted index of {310, 410} indicating that the node originated from both the tree 310 and the tree 410, any node with a triangular shape has an inverted index of {410} indicating that the node originated from the tree 410, and any node with a rectangular shape has an inverted index of {310} indicating that the node originated from the tree 310.

The query engine 230 may match a received query 115 against the document index 170 to determine a set of matching nodes from the document index 170. The inverted index associated with each matching node may be used by the query engine 230 to retrieve the trees 215 that may match the query 115. The query 115 may then be executed again against the documents 160 that were used to generate the retrieved trees 215 and the results may be returned to the client device 110 associated with the query 115 as the results 125.

Because the document index 170 is a tree 215, the previously described recursive algorithm used for matching queries 115 on trees 215 may also be used by the query engine 230 for matching queries 115 on the document index 170 with a few modifications. The meaning of the queries when applied to the document index 170 is defined recursively below for the query 115 operators and node matchers.

| Query(q,v) | Case q of: | Result |
|---|---|---|
| | $\epsilon$ | {v} |
| | nm | {v} if exists a label l in v.labels that nm(l) <br> { } otherwise |
| | / | v.children |
| | ? | {v} |
| | Q1 & Q2 | Query(Q1, v) ∩ Query(Q2,v) |
| | Q1 \| Q2 | Query(Q1,v) ∪ Query(Q2,v) |
| | Q1 Q2 | $\bigcup_{u \in Query(Q1,v)}$ Query(Q2, u) |
| | Q1* | $\bigcup_{i \geq 0}$ Query($Q_1^i$, v) |
| | ^Q1 | {v} if Query(Q1, v) ≠ { } <br> { } otherwise |

As may be appreciated, depending on the operations in the query 115 the nodes of the document index 170 that are found to match a query may produce an overly conservative result (i.e., may return non-matching nodes). In order to reduce the number of false positives, in some implementations, the query engine 230 may record the "reason" that a node of the document index 170 is selected for the results 125 at each part of a query is processed. The reason may be the particular trees 215 that were associated with the selected or matching node. Accordingly, at each step of processing the query 115, the query engine 230 may determine the trees 215 that are associated with any selected or matching node. The associated trees 215 may be determined by the query engine 230 using the inverted index associated with each node.

The query engine 230 may determine the results 125 associated with the query 115 by combining the determined trees 215 from each sub-query based on the particular operators associated with the sub-queries of the query 115. For example, for the or operators and snap operators, the query engine 230 may take the union of the trees 215 produced by the sub queries. For the and operators and the child operators, the query engine 230 may take the intersection of the trees 215 produced by the sub-queries.

For such implementations, the reason or set of trees 215 J associated with a selected or matching node u for a query q applied to a node v of the document index is defined as J(q, v, u). For each node u that is in the results of the query q run at v, the set J(q, v, u) may explain why u is in the results by identifying a set of trees 215. The meaning of the queries when applied to the document index 170 incorporating J(q, v, u) is defined recursively below for the query operators and node matchers.

$q = \text{nm}, q = ?, q = \epsilon, q = l$:

$$J(q, v, u) = \begin{cases} I(v) & \text{for } u \in I[\![q, v]\!] \\ \emptyset & \text{otherwise} \end{cases}$$

$$J(q_1, q_2, v, u) = \bigcup_{u_1 \in I[\![q_1, v]\!], v_1 \in I[\![q_2, u_1]\!]} (J(q_1, v, u_1) \cap J(q_2, v_1, u))$$

$$J(q_1 \mid q_2, v, u) = J(q_1, v, u) \cup J(q_2, v, u)$$

$$J(q_1 \& q_2, v, u) = J(q_1, v, u) \cap J(q_2, v, u)$$

$$J(q^*, v, u) = I(v) \cup \bigcup_{u \geq 1} J(q^n, v, u)$$

$$J(\hat{\ }q, v, u) = \bigcup_{u \in I[\![q, v]\!]} J(q, v, u)$$

In some implementations, rather than using the tree based methods described above, the document engine 150 may process queries 115 based on one or more lattices. Each query 115 may be modeled as a matrix indexed with v and u, where u is one of the nodes from the result of applying the query to the node v. The matrix may have lattice-valued elements. The lattice L may be a power-set lattice and may include subsets of the trees 215. The lattice may have operations $\land$ and $\lor$, the bottom and top elements are denoted by $\bot$ and $\top$. For two finite sets A and B of indices, $\text{Mat}_L(A,B)$ may be the set of matrices indexed with values from A and B and with values from the lattice L. If M is such a matrix, M[a,b] is an element of the matrix, a value from L, where a is an element of A and B is an element of B.

The index engine 220 may model each of the trees 215 and the document index 170 as one or more L-labeled trees. An L-labeled tree t may take the form t=(V, C, label), where V is a set of nodes, $C \in \text{Mat}_L(V,V)$ is called the child matrix, and label $\in \text{Mat}_L(V,\Sigma)$ is called the labeling matrix. $\Sigma$ represents all possible labels. Each matrix may take values from the lattice L. Each node matcher function nm may be defined a vector where nm $\in \text{Vec}_L(\Sigma)$ can be encoded as a vector indicating the places where each label in $\Sigma$ appears. $T_A$ represents a vector indexed with elements from A where all values are the top element of the lattice. For a vector A, $\Delta A$ represents a diagonal matrix with all elements bottom, and with the diagonal having the elements of A.

A received query q when applied to the L-labeled tree t can be represented as a square matrix Query(q)$\in \text{Mat}_L(V, V)$ with values from the lattice L. The square matrix Query(q) may be computed inductively by the query engine 230 from the received query q. The meaning of the queries 115 when applied by the query engine 230 can be defined recursively below:

| Query(q) | Case q of: | result |
|---|---|---|
| | $\epsilon$ | I (identity matrix) |
| | Nm | $\Delta$(label nm) |
| | / | C |
| | ? | $\Delta$(label $T_\Sigma$) |
| | Q1 & Q2 | Query(Q1)$\land$ Query(Q2) |
| | Q1 \| Q2 | Query(Q1) $\lor$ Query(Q2) |
| | Q1 Q2 | Query(Q1) Query(Q2) |
| | Q1* | $\lor_{i \geq 0}$ Query($Q_1^i$, v) |
| | ^Q1 | $\Delta$(query($Q_1$)$T_V$) |

In some implementations, the query engine 230 may generate a matrix from each sub-query of a received query 115, and the document index. The query engine 115 may further generate a matrix operation based on each sub-query. The query engine 230 may then identify one or more documents of the plurality of documents that are responsive to the query 115 by evaluating the generated matrix from each sub-query of the received query, the generated matrix from the document index, and the generated matrix operation from each sub-query. The query engine 230 may then run the query against the identified documents to determine a subset of the identified one or more documents that are responsive to the query 115.

In some implementations, rather than using the tree based and lattice based methods described above, the document engine 150 may process queries 115 using non-deterministic finite state automata (NFA). For a given tree T and a query q, matching the query q against the tree T by the query engine 230 may be expressed as a graph search on a graph defined as the product of T and another graph A(q) which depends on the query q. As discussed further below, the construction of A(q) by the query engine 230 may be similar to the process of transforming a regular expression to an automaton.

An NFA N may be described as a tuple of N=(Q, Π, s, t) where Q is the set of states, s∈Q is the start state of the NFA, t∈Q is the final state of the NFA, and Π describes the transitions between two states. Each transition may be one of three types including an ϵ-transition, a node matcher transition (μ-transition), and a child transition (τ-transition).

The query engine 230 may construct the NFA N[q] from a received query q recursively: it first constructs, recursively, the NFA for each sub-query of q and then combines those NFAs into one for q. The following describes in more details the construction process.

N[nm] has two states s and t, the only transition from s to t is labeled with nm.

N[/] has two states s and t, and there is a τ-transition from s to t.

N[$q_1 q_2$] is obtained by the query engine 230 concatenating $N_1$ and $N_2$, merging $t_1$ and $s_1$, and letting s=$s_1$ and t=$t_2$.

N[$q_1 | q_2$] may be obtained by the query engine 230 adding a new start state s and a final state t, and adding a ϵ-transition from s to $s_1$ and $s_2$, and from $t_1$, $t_2$ to t.

N[$q_1^*$] may be obtained by the query engine 230 adding a ϵ-transition from t to s.

N[$q_1 \& q_2$] may be obtained by the query engine 230 taking the product of the two NFAs. For an ϵ or μ-transition $\pi_1$=($q_1$, $q'_1$)∈$\Pi_1$, for each $q_2$∈$Q_2$ the query engine 230 may add a transition from ($q_1$, $q_2$) to (c$q'_1$, $q_2$) with the same transition type. When $\pi_1$ is a μ-transition, the query engine 230 may assign $nm_\pi$=$nm_{\pi 1}$. Symmetrically, the query engine 230 may perform similar assignments in $\Pi_2$. In addition, for each τ-transition ($q_1$, $q'_1$)∈$\Pi_1$ and each τ-transition ($q_2$, $q'_2$)∈$\Pi_2$, the query engine 23 may add a τ-transition from ($q_1$, $q_2$) to ($q'_1$, $q'_2$) in Π. Further, the query engine 230 may let s=($s_1$, $s_2$) and t=($t_1$, $t_2$).

ˆ$q_1$ may be dealt with differently by reversing the direction of graph constructed for $q_1$ and searching the graph to obtain the result of ˆ$q_1$. Once the result of ˆ$q_1$ is computed, it may be treated as a node matcher in the query that includes it as a sub-query.

After constructing the NFA from a query 115 as described above, the query engine 230 may construct the graph A(q) from the NFA. In some implementations, the query engine 230 may construct the graph by generating an edge for each transition in the NFA. Where the transition is an ϵ-transition, for each vertex v in the graph, the query engine 230 may add an edge from (v, $q_1$) to (v, $q_2$) and may assign the weight T (i.e., true) to the edge. Where the transition is an μ-transition, for each vertex v in the graph, the query engine 230 may add an edge from (v, $q_1$) to (v, $q_2$) and may assign the weight $nm_\pi$ to the edge. Where the transition is a τ-transition, for any parent child pair u, v in τ, the query engine 230 may add an edge from (v, $q_1$) to (v, $q_2$), and may assign the weight C(u, v) to the edge.

Once the graph is constructed, the query engine 230 may search the graph to compute the query result. The graph search may be done using standard graph search algorithm such as the breadth first search.

Figure 6:
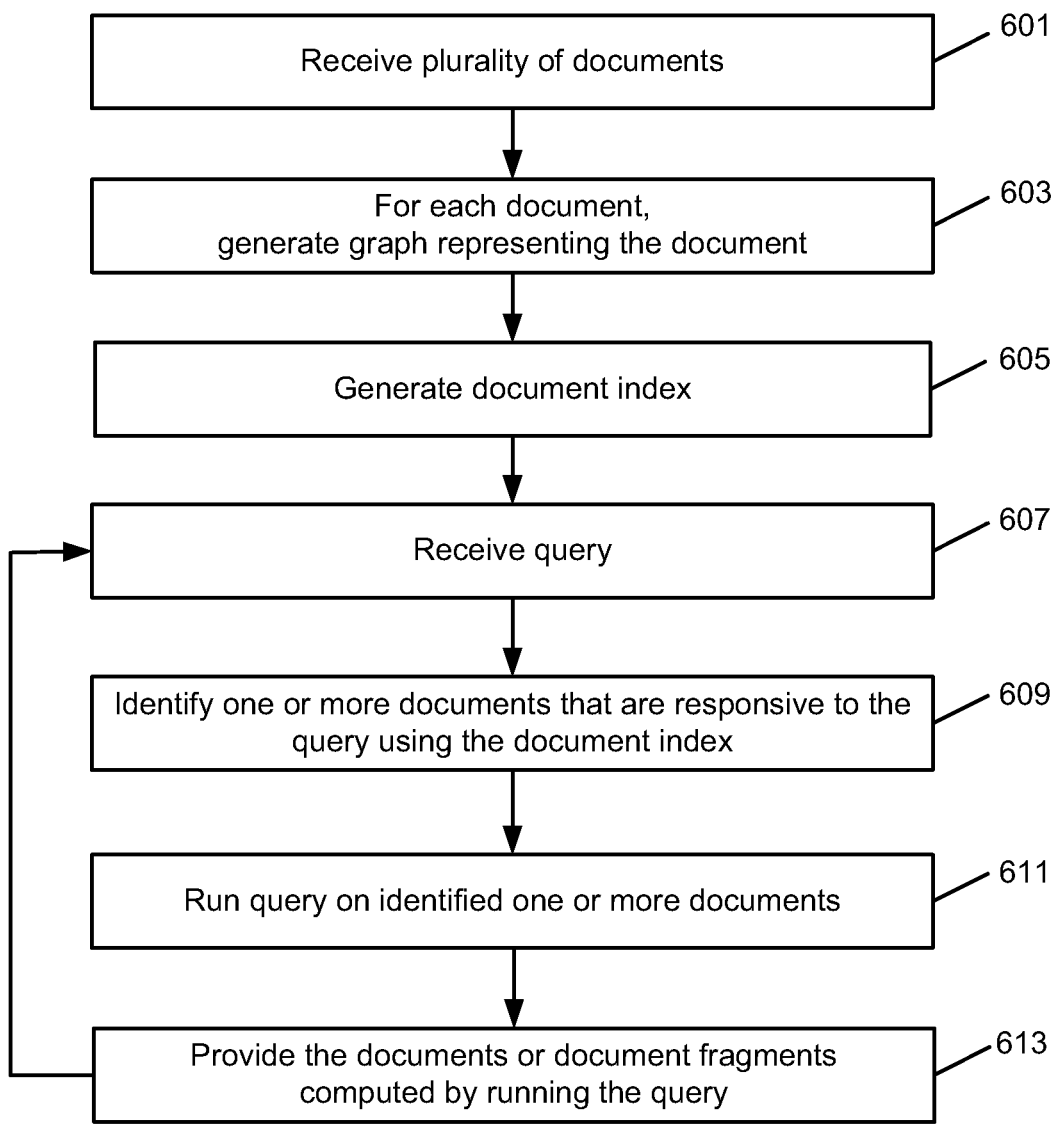
FIG. 6 is an operational flow of an implementation of a method for fulfilling a query using a document index.

FIG. 6 is an operational flow of an implementation of a method 600 for fulfilling a query using a document index 170. The method 600 may be implemented by the document engine 150.

A plurality of documents is received at 601. The documents 160 may be received by the document engine 150. The documents may be JSON documents, or XML documents. Each document may include a plurality of objects. Each object may include one or more objects, and may also include one or more values.

For each document, a graph representing the document is generated at 603. The graph may be generated by the tree engine 210 of the document engine 150. In some implementations, the graphs may be trees. The tree engine 210 may recursively generate a tree 215 for a document by generating a node for each object of the document.

A document index is generated at 605. The document index 170 may be generated by the index engine 220 by merging or combining the nodes of generated graphs. The document index 170 may also include an inverted index for each node. The inverted index for a node may identify the graph or graphs that the node is part of.

A query is received at 607. The query 115 may be received by the query engine 230 of the document engine 150 from a client device 110. The query 115 may include one or more sub-queries, and each sub-query may correspond to an operator or a node matcher. The query 115 may be request to identify one or more documents 160 that match the query 115.

One or more documents that are responsive to the query are identified at 609. One or more documents 160 may be identified by the query engine 230 using the document index 170. The query engine 230 may determine nodes from the document index 170 that match the query 115, and may use the inverted index associated with the determined nodes to identify one or more associated graphs In some implementations, the query engine 230 may recursively process each sub-query of the query 115. For a first sub-query, the query engine 230 may identify nodes of the document index 170 that match the first sub-query. The query engine 230 may then identify nodes from the identified nodes that match the first sub-query that match a next sub-query, and so forth. The set of nodes that matches each of the sub-queries may then be used to determine the documents 160 that may be responsive to the query 115 using the inverted index associated with each node as described above.

The query is run on the identified one or more documents to generate a subset of the one or more documents at 611. The query may be run by the query engine 230 by matching the query against the identified one or more documents, and selecting any matched documents for the subset. The documents that are the result of the query may include fragments of the identified documents.

The documents or document fragments are provided at 613. The documents or fragments may be provided by the document engine 150 to the client device 110 that originated the query 115 as the results. After providing the results, the method 600 may continue at 607.

Figure 7:
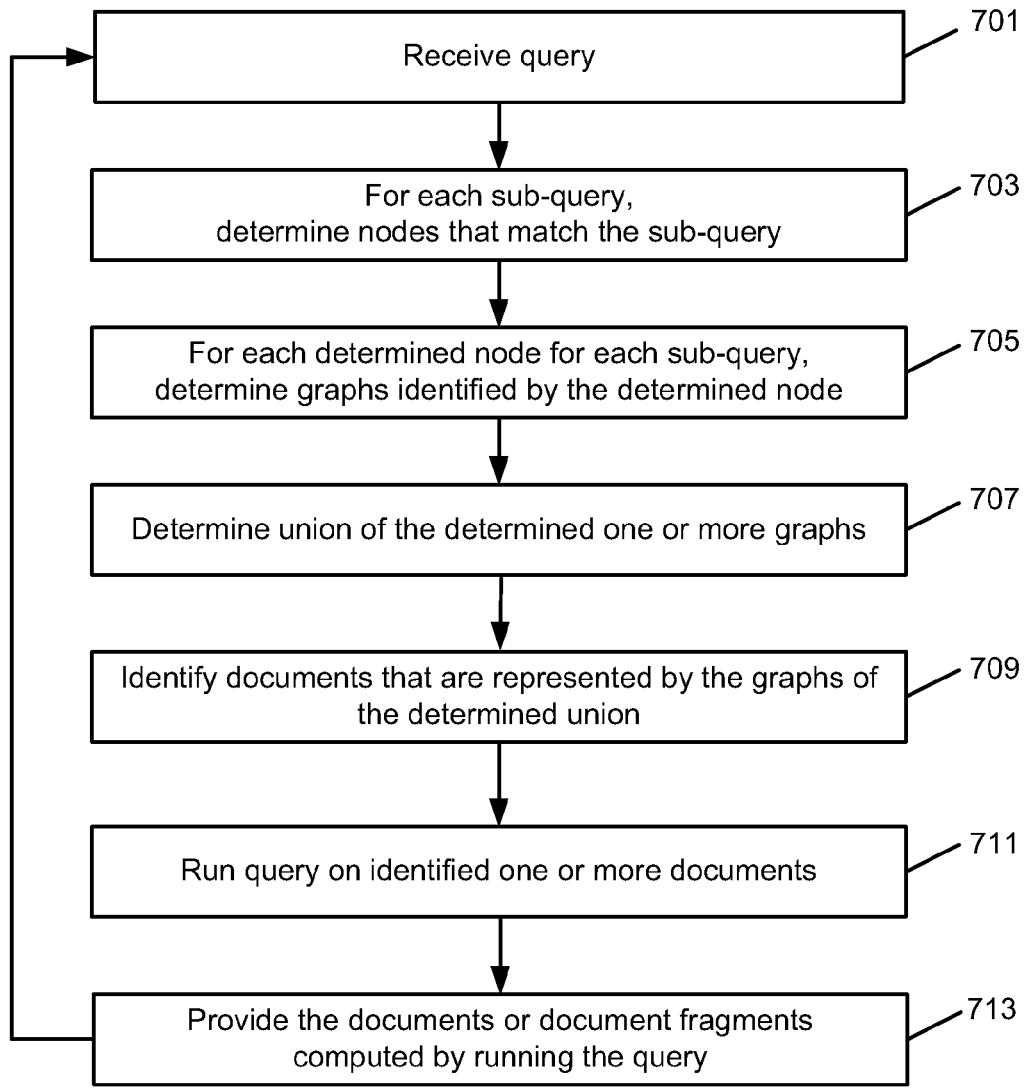
FIG. 7 is an operational flow of another implementation of a method for fulfilling a query using a document index.

FIG. 7 is an operational flow of an implementation of a method 700 for fulfilling a query 115 using a document index 170. The method 700 may be implemented by the document engine 150.

A query is received at 701. The query 115 may be received by the query engine 230 of the document engine 150 from a client device 110. The query 115 may include one or more sub-queries, and each sub-query may correspond to an operator or a node matcher. The query 115 may be a request to identify one or more documents 160 that match the query 115.

For each sub-query, nodes that match the sub-query are determined at 703. The matching nodes may be determined query engine 230 from the document index 170. A node may match a query if its value matches a node matcher or operator associated with the sub-query. The document index 170 may be a graph, such as a tree, that includes a plurality of nodes. Each node may be node that is part of one or more graphs that each represents one of the documents 160. Each node of the document index may have an inverted index that identifies the graph that it is part of.

For each determined node for each sub-query, graphs that are identified by each node are determined at 705. The graphs may be trees and may be determined by the query engine 230 using the inverted index associated with each node in the document index 170.

A union of the determined one or more graph is determined at 707. The union may be determined by the query engine 230. The union may be the union of the graphs identified by the determined matching nodes for each sub-graph.

The documents that are represented by the graphs of the determined union are identified at 709. The documents 160 may be identified by the query engine 330.

The query is run on the identified documents to generate a subset of the documents at 711. The query may be run by the query engine 230 by matching the query against the identified documents, and selecting any matched documents or document fragments for the subset.

The documents or document fragments are provided at 713. The documents or document fragments may be provided to the client device 110 that provided the query 115 as the results 125. After providing the results, the method 700 may continue at 701.

Figure 8:
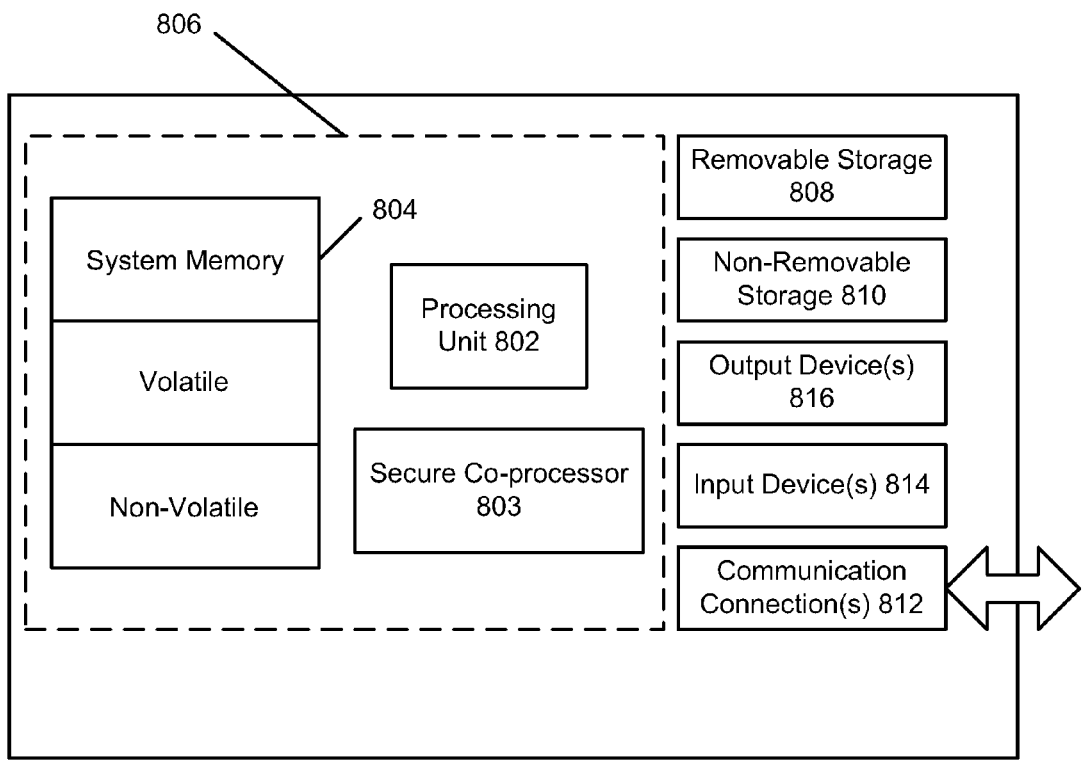
FIG. 8 shows an exemplary computing environment in which example embodiments and aspects may be implemented.

FIG. 8 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by computing device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communication connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
receiving a plurality of documents by a computing device, wherein each document comprises a plurality of objects;
for each document, generating a graph representing the document by the computing device, wherein each graph comprises a node corresponding to each object of the represented document;
generating a document index by merging the generated graphs by the computing device, wherein each node in the document index includes identifiers of one or more graphs that include the node, and wherein the document index comprises a graph;
generating a matrix from the document index by the computing device;
receiving a query by the computing device;
generating a matrix from the received query by the computing device;
generating one or more matrix operations from the received query by the computing device;
identifying one or more documents of the plurality of documents that are responsive to the query using the matrix generated from the document index, the matrix generated from the received query, and the one or more matrix operations by the computing device;
running the query on the identified one or more documents to generate a subset of the identified one or more documents by the computing device; and
providing the subset of the one or more identified documents in response to the query by the computing device.

2. The method of claim 1, wherein the identified one or more documents includes document fragments.

3. The method of claim 1, wherein the generated graphs comprise trees.

4. The method of claim 1, wherein the received query comprises a plurality of sub-queries, wherein generating the one or more matrix operations comprises generating a matrix operation from each sub-query of the plurality of sub-queries, and further comprising:
identifying one or more documents of the plurality of documents that are responsive to the received query by evaluating the generated matrix from each sub-query of the received query, the generated matrix from the document index, and the generated matrix operation from each sub-query.

5. The method of claim 1, wherein the identifiers of the one or more graphs comprises an inverted index.

6. A method comprising:
receiving a document index by a computing device, wherein the document index comprises a plurality of nodes, each node includes identifiers of one or more graphs of a plurality of graphs, each graph represents a document of a plurality of documents, and wherein the document index comprises a graph;
generating a matrix from the received document index by the computing device;
receiving a query by the computing device, wherein the query comprises a plurality of sub-queries;
for each sub-query:
generating a matrix from the sub-query by the computing device;
generating a matrix operation from the sub-query;
determining nodes in the document index that match the sub-query by evaluating the matrix generated from the sub-query, the matrix operation generated from the sub-query, and the matrix generated from the document index by the computing device; and
for each determined node that matches the sub-query, determining the one or more graphs identified by the identifiers of the determined node by the computing device;
determining a union of the determined one or more graphs for each sub-query by the computing device;
identifying documents that are represented by the graphs of the determined union of the determined one or more graphs by the computing device;
running the query on the identified documents to generate a subset of the identified documents; and
providing the subset of the identified documents in response to the query by the computing device.

7. The method of claim 6, wherein the plurality of documents are one or more of JavaScript Object Notation (JSON) documents, and XML documents.

8. The method of claim 6, wherein the identified documents include document fragments.

9. The method of claim 6, wherein the received document index is generated by merging the plurality of graphs.

10. The method of claim 6, wherein the identifiers of one or more graphs of the plurality of graphs comprise inverted indexes.

11. A system comprising:
a computing device;
an index engine configured to generate a document index from a plurality documents, wherein the document index includes a plurality of nodes, each node identifies one or more documents of the plurality of documents, and wherein the document index comprises a graph; and
a query engine configured to:
generate a matrix from the document index;
receive a query;
generate one or more matrix operations from the received query;
generate a matrix from the received query;
identify one or more documents of the plurality of documents that are responsive to the query by evaluating the matrix generated from the document index, the matrix generated from the received query, and the one or more matrix operations;
run the query on the identified one or more documents to generate a subset of the identified one or more documents; and
provide the subset of the identified one or more documents in response to the query.

12. The system of claim 11, wherein the index engine configured to generate a document index from a plurality documents comprises the index engine configured to:
for each document, generate a graph representing the document, wherein each graph comprises a node corresponding to an object of the document; and
generate the document index by merging the nodes of the generated graphs, wherein each node in the document index includes identifiers of one or more graphs that include the node.

13. The system of claim 12, wherein the graphs comprise trees.

14. The system of claim 11, wherein the plurality of documents are one or more of JavaScript Object Notation (JSON) documents, and XML documents.

15. The system of claim 11, wherein the identified one or more documents include document fragments.

\* \* \* \* \*